US012331646B1

(12) United States Patent
Ruiz Espinel et al.

(10) Patent No.: US 12,331,646 B1
(45) Date of Patent: Jun. 17, 2025

(54) AIR SEAL FOR A TURBINE ENGINE

(71) Applicant: RTX Corporation, Farmington, CT (US)

(72) Inventors: Sebastian Ruiz Espinel, Miami, FL (US); Ryan P. Humelsine, Hartford, CT (US); Richard N. Allen, West Hartford, CT (US); Kar D. Chin, Simsbury, CT (US); Jason D. Himes, Tolland, CT (US); Victor A. Lammoglia Hoyos, Mayaguez, PR (US); Argenis Roberto Cruz Mercado, RedLands, CA (US); Carlos Rendon Roman, San Antonio, PR (US); Rachel Irujo, Enfield, CT (US); Wilfred J. De Jesus Vargas, Aguada, PR (US); Bryan D. Roseberry, Rocky Hill, CT (US); James J. Gander, Rocky Hill, CT (US); Amy M. Sunnarborg, St. Petersburg, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/662,538

(22) Filed: May 13, 2024

(51) Int. Cl.
*F01D 11/12* (2006.01)
*F01D 11/00* (2006.01)

(52) U.S. Cl.
CPC .......... *F01D 11/122* (2013.01); *F01D 11/001* (2013.01); *F05D 2240/55* (2013.01)

(58) Field of Classification Search
CPC . F01D 11/001; F05D 2240/55; F05D 2260/33
See application file for complete search history.

(56) References Cited

U.S. PATENT DOCUMENTS

| | | | | |
|---|---|---|---|---|
| 4,084,919 | A * | 4/1978 | Morris, Jr. | F01D 11/001 277/421 |
| 4,822,244 | A * | 4/1989 | Maier | F01D 5/3015 415/115 |
| 5,173,024 | A * | 12/1992 | Mouchel | F01D 5/066 416/220 R |
| 5,816,776 | A | 10/1998 | Chambon | |
| 5,984,636 | A | 11/1999 | Fahndrich | |
| 6,464,453 | B2 * | 10/2002 | Toborg | F01D 5/081 415/174.4 |
| 6,481,959 | B1 * | 11/2002 | Morris | F01D 5/143 415/115 |

(Continued)

*Primary Examiner* — Brian P Wolcott
(74) *Attorney, Agent, or Firm* — Getz Balich LLC

(57) ABSTRACT

An air seal is provided which extends axially between a first side and a second side. The air seal includes an axial flange, a radial flange, a seal element, a retainer neck and a retainer head. The axial flange extends axially to the second side. The radial flange is connected to the axial flange at the second side. The radial flange projects radially outward from the axial flange to a distal end. The seal element projects radially outward from the distal end of the radial flange. The retainer neck is connected to the radial flange at the distal end of the radial flange. The retainer neck projects axially out from the radial flange towards the first side and then projects radially outward to the retainer head. The retainer head projects axially towards the first side and away from the retainer neck to an axial end of the retainer head.

19 Claims, 5 Drawing Sheets

(56) References Cited

U.S. PATENT DOCUMENTS

| | | | | |
|---|---|---|---|---|
| 7,025,565 | B2 * | 4/2006 | Urso | F01D 25/10<br>415/173.5 |
| 7,048,497 | B2 * | 5/2006 | Arilla | F01D 11/001<br>415/180 |
| 8,313,289 | B2 * | 11/2012 | Caprario | F01D 5/3015<br>415/173.7 |
| 9,051,847 | B2 * | 6/2015 | Aiello | F01D 11/001 |
| 9,169,737 | B2 * | 10/2015 | Aiello | F01D 11/001 |
| 9,284,847 | B2 | 3/2016 | Belmonte | |
| 9,664,059 | B2 * | 5/2017 | Feldmann | F01D 11/02 |
| 10,196,895 | B2 * | 2/2019 | Weinert | F01D 5/081 |
| 10,227,991 | B2 * | 3/2019 | Wilber | F04D 29/324 |
| 10,443,450 | B2 * | 10/2019 | Wilson | F01D 5/26 |
| 10,975,707 | B2 * | 4/2021 | Paradis | F01D 11/006 |

* cited by examiner

AIR SEAL FOR A TURBINE ENGINE

BACKGROUND OF THE DISCLOSURE

1. Technical Field

This disclosure relates generally to a turbine engine and, more particularly, to an air seal for the turbine engine.

2. Background Information

A turbine engine may include a turbine air seal to facilitate sealing a gap between a stationary structure and a turbine rotor in the turbine engine. Various types and configurations of air seals are known in the art. While these known air seals have various benefits, there is still room in the art for improvement.

SUMMARY OF THE DISCLOSURE

According to an aspect of the present disclosure, an apparatus is provided for a turbine engine. This apparatus includes an air seal configured to rotate about an axis. The air seal extends axially along the axis between a first side and a second side. The air seal includes an axial flange, a radial flange, a seal element, a retainer neck and a retainer head. The axial flange extends axially to the second side of the air seal. The radial flange is connected to the axial flange at the second side of the air seal. The radial flange projects radially outward from the axial flange to a distal end. The seal element projects radially outward from the distal end of the radial flange. The retainer neck is connected to the radial flange at the distal end of the radial flange. The retainer neck projects axially out from the radial flange towards the first side of the air seal and then projects radially outward to the retainer head. The retainer head projects axially towards the first side of the air seal and away from the retainer neck to an axial end of the retainer head.

According to another aspect of the present disclosure, another apparatus is provided for a turbine engine. This apparatus includes an air seal configured to rotate about an axis. The air seal extends axially along the axis between a first side and a second side. The air seal includes a tubular member, an annular member, a seal element, a curved retainer neck and a retainer head. The annular member circumscribes and is connected to the tubular member at a first end of the air seal. The seal element circumscribes and is connected to the annular member at an outer end of the annular member. The curved retainer neck is connected to the annular member at the outer end of the annular member. The curved retainer neck extends longitudinally along a trajectory out from the annular member to the retainer head. The trajectory along an inner section of the curved retainer neck that is axially adjacent the annular member is angularly offset from the trajectory along an outer section of the curved retainer neck that is radially adjacent the retainer head by an offset angle between eighty degrees and one hundred degrees. The retainer head projects axially away from the curved retainer neck to opposing axial ends of the retainer head.

According to still another aspect of the present disclosure, another apparatus is provided for a turbine engine. This apparatus includes a rotor, an air seal and an abradable seal land. The rotor includes a rotor disk and a plurality of rotor blades attached to the rotor disk. The rotor blades are arranged circumferentially around an axis in an array. The air seal extends axially along the axis between a first side and a second side. The air seal includes a mount, a radial flange, a knife-edge seal element, a retainer neck and a retainer head. The mount is disposed at the first side of the air seal and is attached to the rotor disk. The radial flange is disposed at the second side of the air seal. The radial flange projects radially outward away from the axis to a distal end. The knife-edge seal element is disposed at the distal end of the radial flange. The retainer neck is disposed at the distal end of the radial flange. The retainer neck projects axially out from the radial flange towards the rotor and then projects radially outward to the retainer head. The retainer head axially engages the blades. The abradable seal land circumscribes and is radially next to a tip of the knife-edge seal element.

The retainer neck may include an inner section, an outer section and an intermediate section. The inner section may project axially out from the radial flange to the intermediate section. The outer section may project radially outward from the intermediate section to the retainer head.

A thickness of the retainer neck may decrease as the inner section extends axially towards the intermediate section.

The retainer neck may follow a straight line trajectory as the inner section projects axially out from the radial flange to the intermediate section.

The retainer neck may follow a trajectory as the inner section projects axially out from the radial flange to the intermediate section. The trajectory may be angularly offset from the axis by a non-zero acute angle less than ten degrees.

The retainer neck may follow a straight line trajectory as the outer section projects radially outward from the intermediate section to the retainer head.

The retainer neck may follow a trajectory as the outer section projects radially outward from the intermediate section to the retainer head. The trajectory may be angularly offset from the axis by between eighty-five degrees and ninety-five degrees.

The inner section may be angularly offset from the outer section between eighty-five degrees and ninety-five degrees.

The retainer neck may follow a curved trajectory as the intermediate section extends from the inner section to the outer section.

The air seal may extend radially between an inner side and an outer side. The retainer head may be disposed at the outer side of the air seal.

The radial flange may have a thickness greater than a thickness of the retainer neck.

The radial flange may follow a trajectory as the radial flange projects radially outward from the axial flange to the distal end of the radial flange. The trajectory may be angularly offset from the axis by between eighty-five degrees and ninety-five degrees.

The axial flange may follow a trajectory as the axial flange projects to the second side of the air seal. The trajectory may be angularly offset from the axis by a non-zero acute angle less than ten degrees.

The seal element may be configured as or otherwise include a knife-edge seal element.

A first groove may project radially into the axial flange from an inner side of the axial flange. The first groove may be located axially between the radial flange and the first side of the air seal.

A second groove may project radially into the axial flange from the inner side of the axial flange. The second groove may be located axially between the first groove and the first side of the air seal.

The apparatus may also include a stationary structure comprising an abradable seal land. The seal element may project radially outward from the distal end of the radial flange to a tip. A tip of the seal element may be radially inboard and next to the abradable seal land.

The apparatus may also include a rotor including a rotor disk and a plurality of blades connected to the rotor disk. The air seal may also include a mount attached to the rotor disk. The axial flange may extend axially out from the mount to the second side of the air seal. The retainer head may be axially abutted against attachments of the blades.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
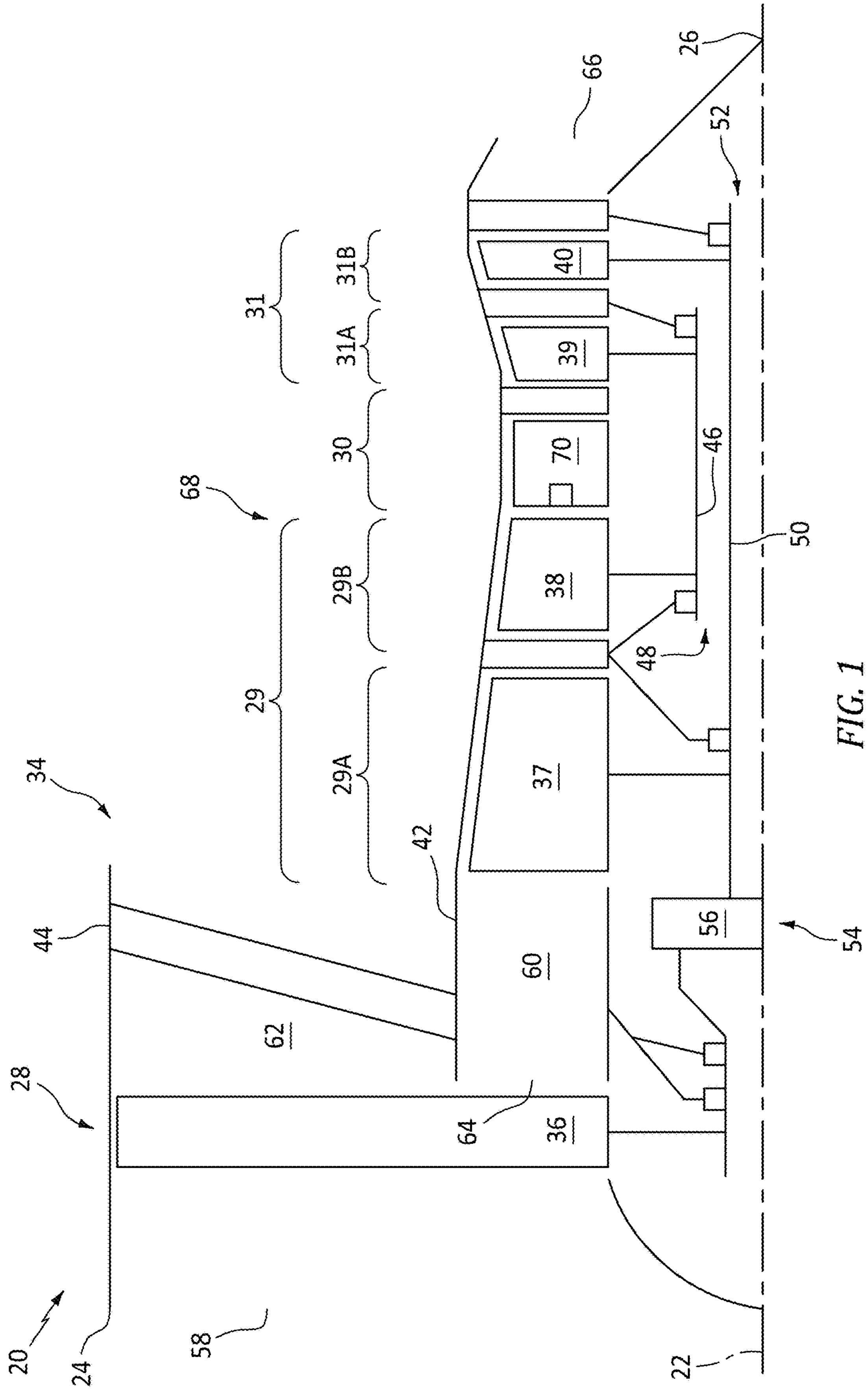
FIG. 1 is a partial schematic illustration of a turbine engine for an aircraft.

FIG. 1 illustrates a turbine engine 20 for an aircraft. The aircraft may be an airplane, a helicopter, a drone (e.g., an unmanned aerial vehicle (UAV)) or any other manned or unmanned aerial vehicle or system. The turbine engine 20 may be configured as, or otherwise included as part of, a propulsion system for the aircraft. The turbine engine 20, for example, may be a turbofan engine, a turbojet engine, a turboprop engine, a turboshaft engine, or any other type of turbine engine configured to generate thrust and/or drive rotation of a ducted or open propulsor rotor configured to generate thrust. The turbine engine 20 may alternatively (or also) be configured as, or otherwise included as part of, a power generation system for the aircraft. The turbine engine 20, for example, may be an auxiliary power unit (APU). The present disclosure, however, is not limited to such exemplary turbine engines. Moreover, it is contemplated the turbine engine 20 may be configured for non-aircraft applications. The turbine engine 20, for example, may be included in an industrial powerplant. However, for case of description, the turbine engine 20 may be described below as a geared turbofan turbine engine.

The turbine engine 20 of FIG. 1 extends axially along an axis 22 from an upstream, forward end 24 of the turbine engine 20 to a downstream, aft end 26 of the turbine engine 20. This axis 22 may be a centerline axis of the turbine engine 20. The axis 22 may also or alternatively be a rotational axis of one or more rotating structures of the turbine engine 20. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B may be arranged sequentially along the axis 22 within an engine housing 34. The fan section 28 includes a bladed fan rotor 36. The LPC section 29A includes a bladed low pressure compressor (LPC) rotor 37. The HPC section 29B includes a bladed high pressure compressor (HPC) rotor 38. The HPT section 31A includes a bladed high pressure turbine (HPT) rotor 39. The LPT section 31B includes a bladed low pressure turbine (LPT) rotor 40. These engine rotor 36-40 are housed within the engine housing 34. The engine housing 34 of FIG. 1, for example, includes an inner case 42 (e.g., a core case) and an outer case 44 (e.g., a fan case). The inner case 42 may house one or more of the engine sections 29A-31B and their engine rotors 37-40. The outer case 44 may house at least the fan section 28 and its fan rotor 36.

The HPC rotor 38 is coupled to and rotatable with the HPT rotor 39. The HPC rotor 38 of FIG. 1, for example, is connected to the HPT rotor 39 by a high speed shaft 46. At least (or only) the HPC rotor 38, the HPT rotor 39 and the high speed shaft 46 collectively form a high speed rotating structure 48; e.g., a high speed spool.

The LPC rotor 37 is coupled to and rotatable with the LPT rotor 40. The LPC rotor 37 of FIG. 1, for example, is connected to the LPT rotor 40 by a low speed shaft 50. At least (or only) the LPC rotor 37, the LPT rotor 40 and the low speed shaft 50 collectively form a low speed rotating structure 52; e.g., a low speed spool. This low speed rotating structure 52 is further coupled to the fan rotor 36 (the driven rotor) through a drivetrain 54. This drivetrain 54 may be configured as a geared drivetrain, where a geartrain 56 (e.g., a transmission, a speed change device, an epicyclic geartrain, etc.) is disposed between and operatively couples the fan rotor 36 to the low speed rotating structure 52 and its LPT rotor 40. With this arrangement, the fan rotor 36 may rotate at a different (e.g., slower) rotational velocity than the low speed rotating structure 52 and its LPT rotor 40. However, the drivetrain 54 may alternatively be configured as a direct drive drivetrain, where the geartrain 56 is omitted. With this arrangement, the fan rotor 36 rotates at a common (the same) rotational velocity as the low speed rotating structure 52 and its LPT rotor 40.

Each of the rotating structures 48, 52 and its members is rotatably supported by a plurality of bearings. Each of these bearings is connected to the engine housing 34 by at least one stationary structure such as, for example, a bearing support frame. Each of the rotating structures 48, 52 and its members may thereby be rotatable about the axis 22.

During turbine engine operation, air enters the turbine engine 20 through an airflow inlet 58. This air is directed through the fan section 28 and into a core flowpath 60 (e.g., annular core flowpath) and a bypass flowpath 62 (e.g., annular bypass flowpath). The core flowpath 60 extends through the engine sections 29A-31B from an airflow inlet 64 into the core flowpath 60 to a combustion products exhaust 66 from the core flowpath 60. The air within the core flowpath 60 may be referred to as "core air". The bypass flowpath 62 extends through a bypass duct and bypasses (e.g., is radially outboard of and extends along) a core 68 of the turbine engine 20; e.g., the engine sections 29A-31B. The air within the bypass flowpath 62 may be referred to as "bypass air".

The core air is compressed by the LPC rotor 37 and the HPC rotor 38 and directed into a combustion chamber 70 of a combustor in the combustor section 30. Fuel is injected into the combustion chamber 70 by one or more fuel injectors and mixed with the compressed core air to provide a fuel-air mixture. This fuel-air mixture is ignited and combustion products thereof flow through and sequentially drive rotation of the HPT rotor 39 and the LPT rotor 40 about the axis 22. The rotation of the HPT rotor 39 and the LPT rotor 40 respectively drive rotation of the HPC rotor 38 and the LPC rotor 37 about the axis 22 and, thus, compression of the air received from the core inlet 64. The rotation of the LPT rotor 40 also drives rotation of the fan rotor 36 about the axis 22. The rotation of the fan rotor 36 propels the bypass air through and out of the bypass flowpath 62. The propulsion of the bypass air may account for a majority of thrust generated by the aircraft propulsion system.

Figure 2:
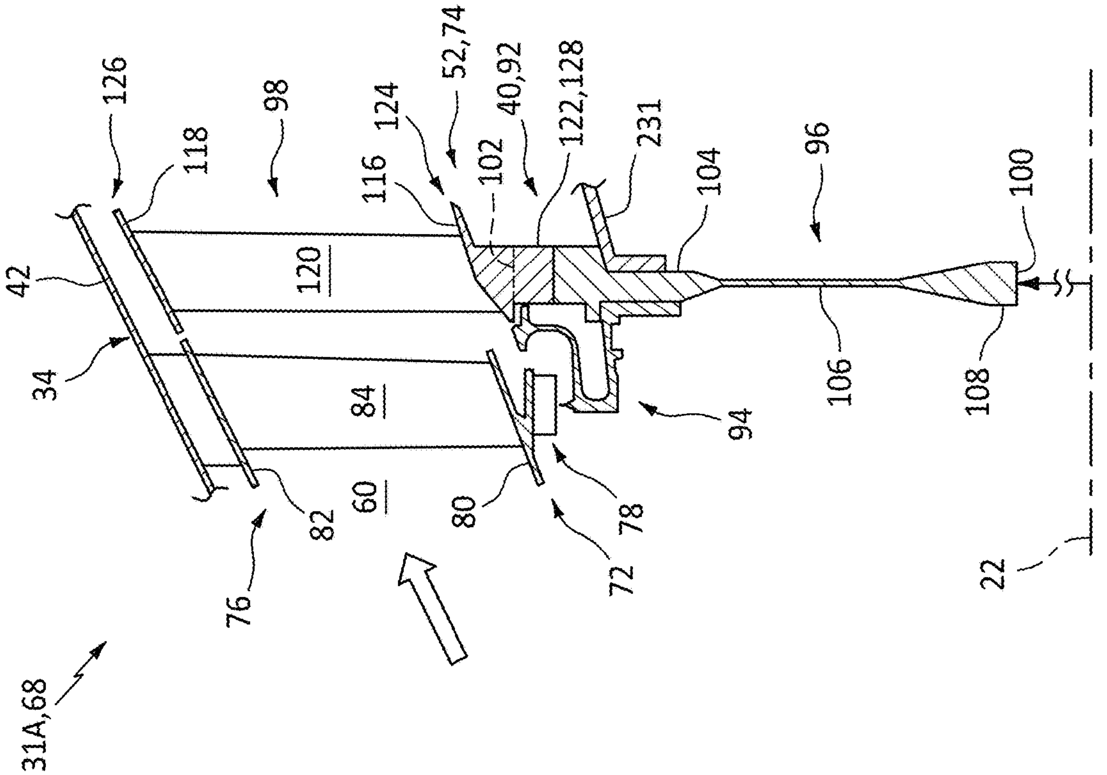
FIG. 2 is a partial sectional illustration of a seal interface between a stationary structure of the turbine engine and a rotating structure of the turbine engine.

FIG. 2 illustrates a seal interface between a stationary structure 72 of the turbine engine and a rotating structure 74 of the turbine engine. For case of description, the rotating structure 74 may be described below as the low speed rotating structure 52 and the seal interface may be described below as being located below the core flowpath 60 within the LPT section 31B. It is contemplated, however, the rotating structure 74 may alternatively be another rotating structure within the turbine engine 20; e.g., the high speed rotating structure 48. It is also contemplated the seal interface may alternatively be located elsewhere within the turbine engine 20; e.g., within the HPT section 31A or one of the compressor sections 29A, 29B.

The stationary structure 72 of FIG. 2 includes a stator vane structure 76 and a seal land 78. The stator vane structure 76 is housed within and attached to the inner case 42 of the engine housing 34. The stator vane structure 76 includes an inner platform 80, an outer platform 82 (not visible in FIG. 2) and a plurality of stator vanes 84.

The inner platform 80 extends axially along the axis 22 between and to an upstream, forward end of the inner platform 80 and a downstream, aft end of the inner platform 80. The inner platform 80 extend radially between and to a radial inner side of the inner platform 80 and a radial outer side of the inner platform 80. The inner platform 80 extends circumferentially about (e.g., completely around) the axis 22 providing the inner platform 80 with, for example, a full-hoop (e.g., frustoconical tubular) geometry. This inner platform 80 forms a radial inner peripheral boundary of a longitudinal section of the core flowpath 60 which extends longitudinally through the stator vane structure 76 at the inner platform outer side.

The outer platform 82 extends axially along the axis 22 between and to an upstream, forward end of the outer platform 82 and a downstream, aft end of the outer platform 82. The outer platform 82 extend radially between and to a radial inner side of the outer platform 82 and a radial outer side of the inner platform 80. The outer platform 82 extends circumferentially about (e.g., completely around) the axis 22 providing the inner platform 80 with, for example, a full-hoop (e.g., frustoconical tubular) geometry. The outer platform 82 may thereby form a radial outer peripheral boundary of the longitudinal section of the core flowpath 60 which extends longitudinally through the stator vane structure 76 at the outer platform inner side.

The stator vanes 84 are arranged and may be equispaced circumferentially about the axis 22 in an annular array; e.g., a circular array. Each of the stator vanes 84 extends radially across the core flowpath 60 and is connected to the inner platform 80 and the outer platform 82. Each of the stator vanes 84, for example, projects radially outward (in a direction radially away from the axis 22) from the inner platform 80 at its inner platform outer side to the outer platform 82 at its outer platform inner side. The stator vanes 84 may be configured within the core flowpath 60 to condition the combustion products flowing through the stator vane structure 76 to the rotating structure 74.

Figure 3:
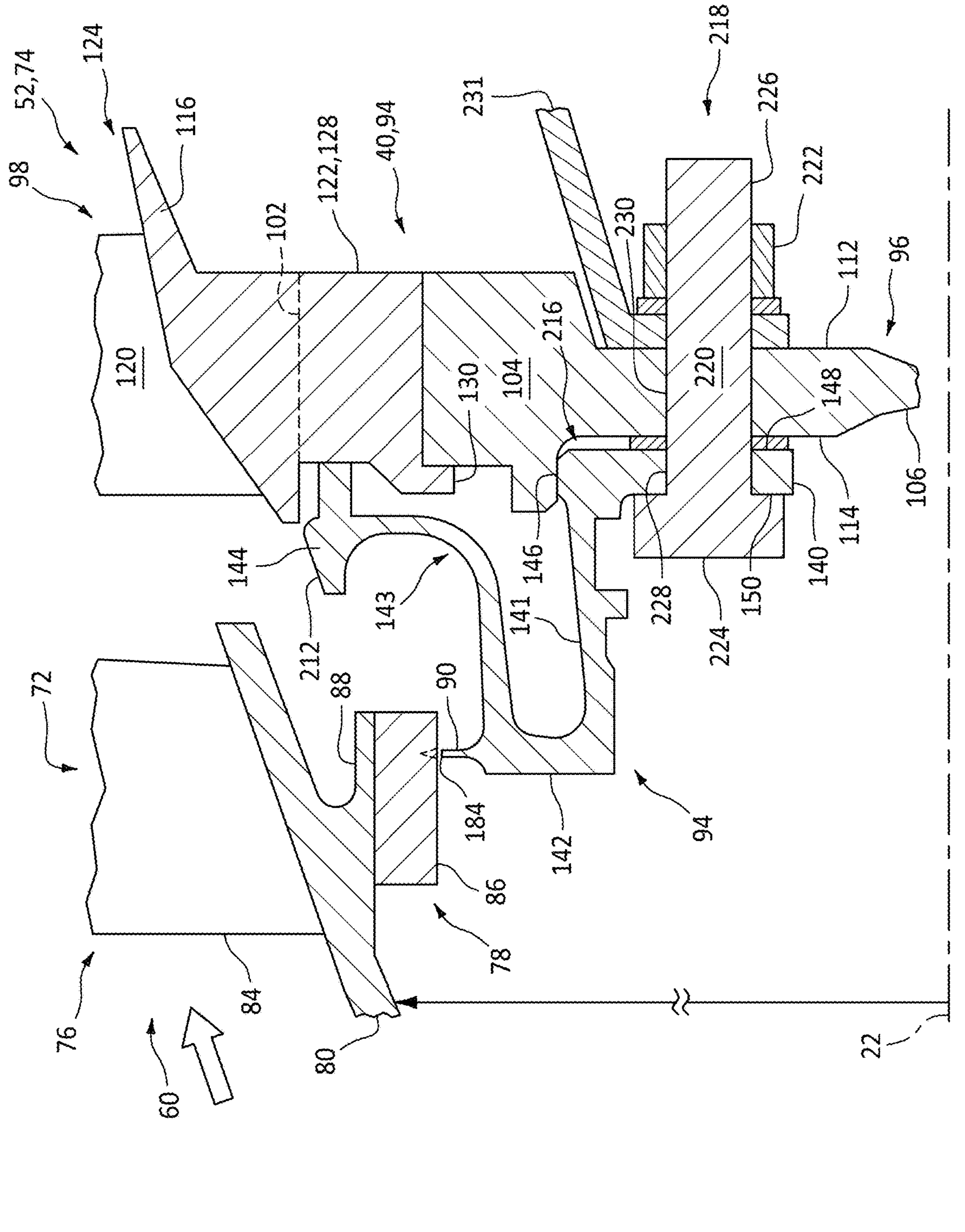
FIG. 3 is a partial sectional illustration of the seal interface at an air seal mounted to the rotating structure.

Referring to FIG. 3, the seal land 78 extends axially along the axis 22 between and to opposing axial ends of the seal land 78. The seal land 78 extends radially between and to a radial inner side 86 of the seal land 78 and a radial outer side of the seal land 78. The seal land 78 extends circumferentially about (e.g., completely around) the axis 22 providing the seal land 78 with, for example, a full-hoop (e.g., cylindrical tubular) geometry. This seal land 78 is disposed within a bore of the inner platform 80. The seal land 78 is mounted to the inner platform 80 at (e.g., on, adjacent or proximate) the inner platform inner side by a seal land mount 88; e.g., pedestal. With this arrangement, the inner platform 80 of FIG. 3 axially overlaps and circumscribes the seal land 78.

The seal land 78 may be configured as or otherwise include an abradable seal land. The seal land 78 of FIG. 3, for example, may be constructed from an abradable material. This abradable material is selected to be partially cut, scraped, worn and/or otherwise abraded away when in contact with a seal element 90 of the rotating structure 74, for example during rotation of the rotating structure 74 about the axis 22. With such an arrangement, following initial contact with the seal element 90 (e.g., following initial break-in), a groove may be formed into the seal land 78 at the seal land inner side 86 (shown in FIG. 3 by a dashed line). Such a break-in process may facilitate relatively close proximity and, thus, reduced gas leakage between the seal land 78 and the seal element 90 during turbine engine operation.

The rotating structure 74 of FIG. 2 includes a bladed rotor 92 and an air seal 94; e.g., a turbine air seal. The bladed rotor 92 may be configured as the LPT rotor 40 (see also FIG. 1). The bladed rotor 92 of FIG. 2 includes at least (or only) a rotor disk 96 and a plurality of rotor blades 98; e.g., low pressure turbine (LPT) blades.

The rotor disk 96 extends radially from a radial inner end 100 of the rotor disk 96 to a radial outer end 102 of the rotor disk 96. This rotor disk 96 includes an outer hub 104, a web 106 and an inner counterweight 108.

The hub 104 is disposed at the rotor disk outer end 102. The hub 104 is configured for connecting (e.g., mounting) the rotor blades 98 to the rotor disk 96. The hub 104 of FIG. 4, for example, includes a plurality of slots 110 (e.g., firtree slots, dovetail slots, etc.) arranged and equispaced circumferentially around the axis 22 in an annular array; e.g., a circular array. Each of these slots 110 projects partially radially inward (in a direction radially towards the axis 22) into the rotor disk 96 and its hub 104 from the rotor disk outer end 102. Referring to FIG. 3, each of the slots 110 may extend axially through the rotor disk 96 and its hub 104 between opposing axial sides 112 and 114 of the hub 104. Alternatively, each of the slots 110 may project partially axially into the hub 104 from the hub second side 114.

Referring to FIG. 2, the web 106 is radially between and connected to the hub 104 and the counterweight 108. The web 106 of FIG. 2, for example, projects radially outward from the counterweight 108 to the hub 104.

The counterweight 108 is disposed at the rotor disk inner end 100. The counterweight 108 of FIG. 2 has an axial thickness sized greater than an axial thickness of the hub 104 and/or an axial thickness of the web 106. The hub axial thickness is sized greater than the web axial thickness. Here, the axial thicknesses may be average axial thicknesses of the respective rotor disk members 104, 106 and 108 or alternatively maximum axial thicknesses of the respective rotor disk members 104, 106 and 108. The present disclosure, however, is not limited to such an exemplary rotor disk configuration. The counterweight 108 and the web 106, for example, may be integrated into a common member (e.g., an annular plate-like member) which projects radially inward from the hub 104 to the rotor disk inner end 100.

The rotor blades 98 are arranged and equispaced circumferentially around the axis 22 in an annular array; e.g., a circular array. Each of the rotor blades 98 may be configured as a shrouded rotor blade. Each of the rotor blades 98 includes an inner platform segment 116, an outer platform segment 118 (e.g., a shroud segment), an airfoil 120 and an attachment 122. In other embodiments, however, each of the rotor blades 98 may be configured as an unshrouded rotor blade and the outer platform segments 118 may be omitted.

Figure 4:
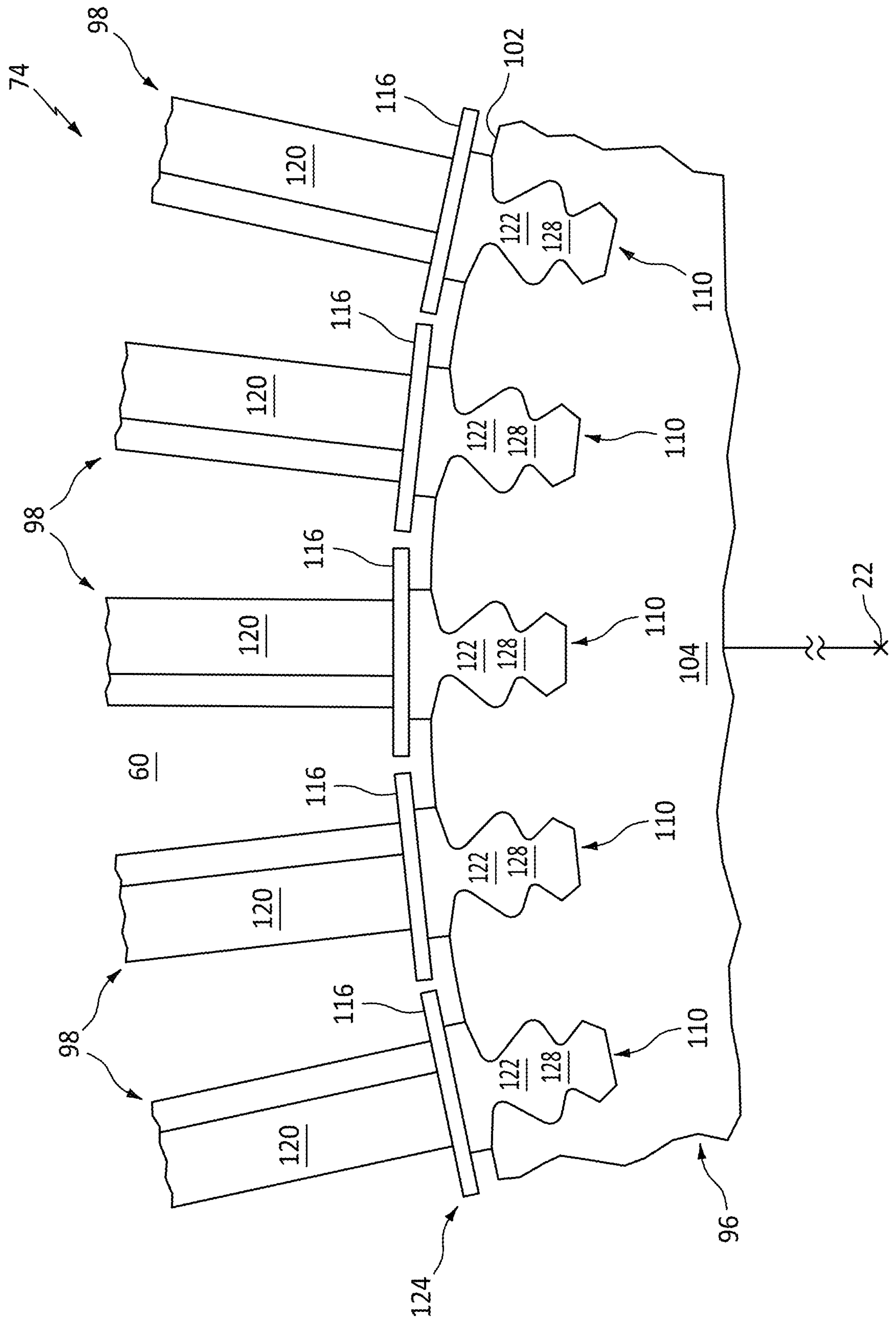
FIG. 4 is a partial end view illustration of the rotating structure.

The inner platform segment 116 extends axially along the axis 22 between and to an upstream, forward end of the inner platform segment 116 and a downstream, aft end of the inner platform segment 116. Referring to FIG. 4, the inner platform segment 116 extends circumferentially about (e.g., partially around) the axis 22 providing the inner platform segment 116 with, for example, an arcuate geometry. When the bladed rotor 92 is assembled, the inner platform segments 116 associated with the rotor blades 98 may collectively form an inner platform 124 of the bladed rotor 92. This rotor inner platform 124 of FIG. 2 may thereby form a radial inner peripheral boundary of a longitudinal section of the core flowpath 60 which extends longitudinally across the bladed rotor 92.

The outer platform segment 118 extends axially along the axis 22 between and to an upstream, forward end of the outer platform segment 118 and a downstream, aft end of the outer platform segment 118. The outer platform segment 118 extends circumferentially about (e.g., partially around) the axis 22 providing the outer platform segment 118 with, for example, an arcuate geometry. When the bladed rotor 92 is assembled, the outer platform segments 118 associated with the rotor blades 98 may collectively form an outer platform 126 of the bladed rotor 92. This rotor outer platform 126 of FIG. 2 may thereby form a radial outer peripheral boundary of the longitudinal section of the core flowpath 60 which extends longitudinally across the bladed rotor 92.

The airfoil 120 extends radially across the core flowpath 60 and is connected to the inner platform segment 116 and the outer platform segment 118. The airfoil 120 of FIG. 2, for example, projects radially outward from the inner platform segment 116 to the outer platform segment 118.

Referring to FIG. 4, the attachment 122 is configured to (e.g., removably) mount the respective rotor blade 98 to the rotor disk 96 at the rotor disk outer end 102. The attachment 122 of FIG. 4, for example, is configured as or otherwise include a blade root 128 (e.g., firtree root, a dovetail root, etc.) for mating with a respective one of the slots 110. In particular, the attachment 122 of FIG. 3 is configured to slide axially (e.g., in a downstream, aft direction along the axis 22/the core flowpath 60) into a respective one of the slots 110 (see FIG. 4) until a stop 130 (e.g., a tab) on the blade root 128 axially contacts the hub 104 at its hub second side 114. With this arrangement, the stop 130 may prevent further axial downstream, aft direction movement of the attachment 122 and, more generally, the respective rotor blade 98 relative to the rotor disk 96 and its hub 104. The present disclosure, however, is not limited to such an exemplary arrangement. For example, further axial downstream, aft direction movement of the attachment 122 may be blocked by a feature (e.g., a slot endwall, etc.) at the hub first side 112.

Figure 5:
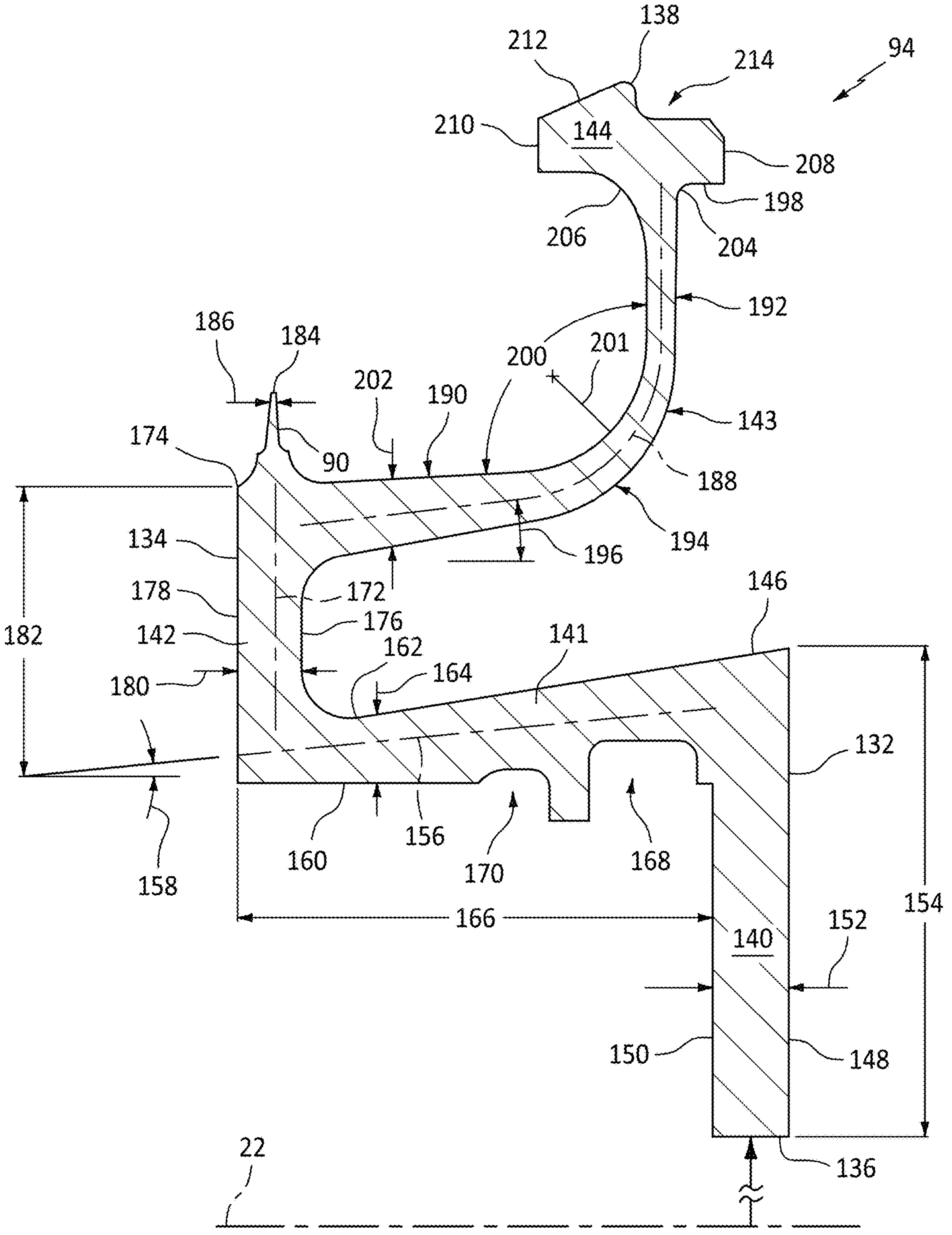
FIG. 5 is a partial sectional illustration of the air seal.

Referring to FIG. 5, the air seal 94 extends axially along the axis 22 between and to a first side 132 of the air seal 94 and a second side 134 of the air seal 94. The air seal 94 extends radially between and to an inner side 136 of the air seal 94 and an outer side 138 of the air seal 94. The air seal 94 and some or all of its members (e.g., 90 and 140-144) extend circumferentially about (e.g., completely around) the axis 22 providing the air seal 94 and its members with full-hoop (e.g., annular and/or tubular) geometries. The air seal 94 of FIG. 5 includes a seal mount 140, an axial flange 141, a radial flange 142, the seal element 90, a curved retainer neck 143 and a retainer head 144.

The seal mount 140 is configured to mount the air seal 94 to the bladed rotor 92 and its rotor disk 96 (see FIG. 3). The seal mount 140 is disposed at the air seal inner side 136 and/or the air seal first side 132. The seal mount 140 of FIG. 5, for example, projects radially out from the air seal inner side 136 to a radial outer distal end 146 of the seal mount 140. The seal mount 140 extends axially along the axis 22 between axially opposing first and second surfaces 148 and 150 of the seal mount 140, where the seal mount first surface 148 of FIG. 5 forms the air seal first side 132. One or both of the seal mount surfaces 148 and 150 may be planar and/or arranged perpendicular to the axis 22. The seal mount 140 has a thickness 152 and a length 154 that is greater than the seal mount thickness 152. The seal mount length 154, for example, may be equal to or greater than five times (5×) or ten times (10×) the seal mount thickness 152. The seal mount thickness 152 of FIG. 5 is measured as a maximum or average axial distance between the seal mount surfaces 148 and 150. The seal mount length 154 of FIG. 5 is measured as a maximum or average radial distance between the air seal inner side 136 and the seal mount distal end 146.

The axial flange 141 may be disposed adjacent the seal mount second surface 150 and is connected to (e.g., formed integral with or otherwise fixed to) the seal mount 140. The axial flange 141 projects longitudinally along a trajectory 156 of the axial flange 141 from the seal mount 140 to the air seal second side 134. This axial flange trajectory 156 includes a (e.g., major) axial component and may also include a (e.g., minor) radial component. The axial flange 141 of FIG. 5, for example, projects (a) axially along the axis 22 in a direction axially away from the air seal first side 132 and (b) radially inward is a direction towards the axis 22 from the seal mount 140 to the air seal second side 134. The axial flange 141 may thereby radially converge inwards towards the axis 22 as the axial flange 141 extends axially from the seal mount 140 to the air seal second side 134. With this arrangement, the axial flange trajectory 156 of FIG. 5 is angularly offset from the axis 22 by a non-zero acute offset angle 158 when viewed, for example, in a reference plane parallel with (e.g., including) the axis 22. This axial flange offset angle 158 may be equal to or less than five degrees (5°), ten degrees (10°) or fifteen degrees (15°). In some embodiments, at least a major portion (e.g., more than 50%) or an entirety of the axial flange trajectory 156 may be a straight line trajectory when viewed, for example, in the reference plane.

The axial flange 141 extends radially between radially opposing sides 160 and 162 of the axial flange 141. The axial flange 141 has a thickness 164 and a length 166 that is greater than the axial flange thickness 164. The axial flange length 166, for example, may be equal to or greater than five times (5×), ten times (10×) or fifteen times (15×) the axial flange thickness 164. The axial flange thickness 164 of FIG. 5 is measured as a maximum or average radial distance between the axial flange sides 160 and 162. The axial flange length 166 of FIG. 5 is measured as a maximum or average axial distance between the seal mount 140 and the air seal second side 134.

The axial flange 141 may include one or more grooves 168 and 170; e.g., annular grooves. The first groove 168 may be configured as a receptacle for an air seal removal device such as an air seal puller (not shown). This first groove 168 is located axially between and spaced from the seal mount 140 and the second groove 170. The second groove 170 may be configured to increase flexibility of the axial flange 141 and/or reduce weight of the axial flange 141. This second groove 170 is located axially between and spaced from the first groove 168 and the radial flange 142. Each of the grooves 168, 170 projects partially radially into the axial flange 141 (in the radial outward direction) from the axial flange inner side 160 to a radial end of the respective groove 168, 170. Each of the grooves 168, 170 extends axially within the axial flange 141 between and to opposing axial sides of the respective groove 168, 170.

The radial flange 142 is disposed at the air seal second side 134. The radial flange 142 may be disposed adjacent the axial flange outer side 162 and is connected to (e.g., formed integral with or otherwise fixed to) the axial flange 141. The radial flange 142 projects longitudinally along a trajectory 172 of the radial flange 142 from the axial flange 141 to a radial outer distal end 174 of the radial flange 142. This radial flange trajectory 172 may include a purely radial component without an axial component. The radial flange 142 thereby projects radially outward from the axial flange 141 to its radial flange distal end 174. With this arrangement, the radial flange trajectory 172 of FIG. 5 is angularly offset from the axis 22 by a right offset angle (90°) when viewed, for example, in the reference plane. In some embodiments, at least a major portion (e.g., more than 50%) or an entirety of the radial flange trajectory 172 may be a straight line trajectory when viewed, for example, in the reference plane. The present disclosure, however, is not limited to such an exemplary embodiment. For example, in other embodiments, the radial flange trajectory 172 may also include a (e.g., slight) axial component such that the radial flange offset angle may be anywhere between eighty-five degrees (85°) and ninety-five degrees (95°).

The radial flange 142 extends axially between axially opposing sides 176 and 178 of the radial flange 142, where the radial flange second side 178 may also be the air seal second side 134. The radial flange 142 has a thickness 180 and a length 182 that is greater than the radial flange thickness 180. The radial flange length 182, for example, may be equal to or greater than two times (2×), three times (3×) or five times (5×) the radial flange thickness 180. The radial flange thickness 180 may also be greater than the axial flange thickness 164. The radial flange thickness 180 of FIG. 5 is measured as a maximum or average axial distance between the radial flange sides 176 and 178. The radial flange length 182 of FIG. 5 is measured as a maximum or average radial distance between the axial flange 141 and the radial flange distal end 174.

The seal element 90 is disposed at the air seal second side 134 and is connected to (e.g., formed integral with or otherwise fixed to) the radial flange 142. The seal element 90 may thereby be axially aligned with the radial flange 142. The seal element 90 of FIG. 5, for example, projects radially outward from the radial flange distal end 174 to a radial outer distal end—a tip 184—of the seal element 90. The seal element 90 may be configured as a knife-edge (KE) seal element. A radial thickness 186 of the seal element 90, for example, may (e.g., continuously) decrease as the seal element 90 extends radially away from the radial flange 142 and towards the seal element tip 184. The seal element 90 of FIG. 5 may thereby axially taper as the seal element 90 projects radially out from the radial flange distal end 174 to (or about) the seal element tip 184.

The retainer neck 143 is configured to flexibly couple the retainer head 144 to the radial flange 142. More particularly, the retainer neck 143 is disposed between and is connected to (e.g., formed integral with or otherwise fixed to) the radial flange 142 and the retainer head 144. The retainer neck 143 extends longitudinally along a bent (e.g., generally L-shaped) trajectory 188 of the retainer neck 143 from the radial flange 142 to the retainer head 144. The retainer neck 143 and its retainer neck trajectory 188 of FIG. 5, for example, project axially out from the radial flange 142, and then the retainer neck 143 and its retainer neck trajectory 188 project radially outward to the retainer head 144. The retainer neck 143 of FIG. 5 includes an inner section 190, an outer section 192 and an intermediate section 194.

The neck inner section 190 is disposed at the radial flange distal end 174 and may be adjacent the radial flange first side 176. The neck inner section 190 projects longitudinally along the retainer neck trajectory 188 out from the radial flange 142 to an inner end of the neck intermediate section 194. Along the neck inner section 190, the retainer neck trajectory 188 includes a (e.g., major) axial component and may also include a (e.g., minor) radial component. The neck inner section 190 of FIG. 5, for example, projects (a) axially along the axis 22 in a direction axially towards the air seal first side 132 and (b) radially outward in a direction away from the axis 22, from the radial flange 142 to the neck intermediate section 194. The neck inner section 190 may thereby radially diverge away from the axis 22 as the neck inner section 190 extends axially from the radial flange 142 to the neck intermediate section 194. With this arrangement, the retainer neck trajectory 188 along the neck inner section 190 of FIG. 5 is angularly offset from the axis 22 by a non-zero acute offset angle 196 when viewed, for example, in the reference plane. This inner section offset angle 196 may be equal to or less than five degrees (5°), ten degrees (10°) or fifteen degrees (15°). In some embodiments, the retainer neck trajectory 188 along at least a major portion (e.g., more than 50%) or an entirety of the neck inner section 190 may be a straight line trajectory when viewed, for example, in the reference plane.

The neck outer section 192 is disposed near the air seal outer side 138 and the air seal first side 132. The neck outer section 192 projects longitudinally along the retainer neck trajectory 188 out from an outer end of the neck intermediate section 194 to a radial inner side 198 of the retainer head 144. Along the neck outer section 192, the retainer neck trajectory 188 may include a purely radial component without an axial component. The neck outer section 192 thereby projects radially outward from the neck intermediate section 194 to the retainer head 144. With this arrangement, the retainer neck trajectory 188 along the neck outer section 192 of FIG. 5 is angularly offset from the axis 22 by a right offset angle (90°) when viewed, for example, in the reference plane. In some embodiments, the retainer neck trajectory 188 along at least a major portion (e.g., more than 50%) or an entirety of the neck outer section 192 may be a straight line trajectory when viewed, for example, in the reference plane. The present disclosure, however, is not limited to such an exemplary embodiment. For example, in other embodiments, the retainer neck trajectory 188 along the neck outer section 192 may also include a (e.g., slight) axial component such that the outer section offset angle may be anywhere between eighty-five degrees (85°) and ninety-five degrees (95°). The neck outer section 192 may thereby be angularly offset from the neck inner section 190 by an inter-section offset angle 200; e.g., between eighty-five degrees (85°) and ninety-five degrees (95°).

The neck intermediate section 194 couples the neck inner section 190 to the neck outer section 192. The neck intermediate section 194 projects longitudinally along the retainer neck trajectory 188 from an axial distal end of the neck inner section 190 to a radial inner distal end of the neck outer section 192. Along the neck intermediate section 194, the retainer neck trajectory 188 may be (e.g., continuously) curved thereby providing the neck intermediate section 194 with a curved (e.g., arcuate) sectional geometry when viewed, for example, in the reference plane. Here, a radius of curvature 201 of the retainer neck trajectory 188 along the neck intermediate section 194 may be greater than a thickness 202 of the retainer neck 143; e.g., equal to or greater than two times (2×) or three times (3×) the retainer neck thickness 202. With the foregoing arrangement, the neck intermediate section 194 may form an elbow section of the retainer neck 143. More particularly, the neck intermediate section 194 provides a bend between the axially extending neck inner section 190 and the radially extending neck outer section 192.

The retainer neck thickness 202 may (e.g., continuously) decrease as the neck inner section 190 extends longitudinally from the radial flange 142 to the neck intermediate section 194. The neck inner section 190 thereby radially tapers as the neck inner section 190 projects axially out from the radial flange 142 to the neck intermediate section 194. The retainer neck thickness 202 may also (or may not) continue to decrease as the neck intermediate section 194 projects longitudinally away from the neck inner section 190. The retainer neck thickness 202 along the neck outer section 192, however, may be uniform as the neck outer section 192 projects radially outward away from the neck intermediate section 194. That said, the retainer neck thickness 202 may increase at an interface between the retainer neck 143 and the retainer head 144 to facilitate provision of one or more fillets 204 and 206.

The retainer head 144 is disposed at the air seal outer side 138. The retainer head 144 may also be disposed at or near the air seal first side 132. The retainer head 144 of FIG. 5, for example, extends axially along the axis 22 between axial opposing ends 208 and 210 of the retainer head 144. The retainer head first end 208 is axially spaced from the retainer neck 143 and its neck outer section 192 by an axial distance. This retainer head first end 208 may be (e.g., slightly) axially recessed from the air seal first side 132. However, it is contemplated the retainer head first end 208 may also form the air seal first side 132 (e.g., elements 148 and 208 may be axially aligned), or the retainer head first end 208 may form the air seal inner side 136 and the seal mount first surface 148 may be (e.g., slightly) axially recessed from the air seal first side 132. Referring again to FIG. 5, the retainer head second end 210 is axially spaced from the retainer neck 143 and its neck outer section 192 by an axial distance. The retainer head 144 extends radially outward from its retainer head inner side 198 to the air seal outer side 138. With the foregoing arrangement, the retainer head 144 may be configured as an air seal hammer head on top of the retainer neck 143.

The retainer head 144 may include a frustoconical surface 212 extending between the retainer head second end 210 and the air seal outer side 138. The retainer head 144 may also or alternatively include a notch 214; e.g., an annular notch. The notch 214 of FIG. 5 projects partially radially into the retainer head 144 from the air seal outer side 138. The notch 214 also projects partially axially into the retainer head 144 from the retainer head first end 208. The present disclosure, however, is not limited to such an exemplary retainer head configuration.

Referring to FIG. 3, the air seal 94 is mounted to the bladed rotor 92. The seal mount 140 of FIG. 3, for example, is nested within an annular notch 216 in the rotor disk 96 and its hub 104. A snap fit or another type of radial interference fit may be provided between the seal mount distal end 146 and the hub 104. The seal mount 140 may also or alternatively be mechanically fastened to the hub 104 by one or more fasteners 218. Each fastener 218 may include a bolt 220 and a nut 222. A head 224 of the bolt 220 may be abutted axially against the seal mount second surface 150, and a shank 226 of the bolt 220 may project sequentially through at least (or only) a respective fastener aperture 228 in the seal mount 140 and a respective fastener aperture 230 in the hub 104. The nut 222 may then be threaded onto the bolt shank 226 and tightened to clamp the seal mount 140 and the hub 104 between the bolt head 224 and the nut 222. These fasteners 218 may also be used for mounting another component 231 to the rotor disk 96 and its hub 104.

The retainer head 144 is abutted axially against the bladed rotor 92. The retainer head 144 of FIG. 3, for example, is abutted axially against the rotor blades 98 and their attachments 122. With this arrangement, the retainer head 144 may be used to axially lock the attachments 122 within the respective slots 110 (see FIG. 4). The retainer head 144 may also axially abut against the hub 104 between circumferentially adjacent attachments 122.

The seal element 90 is disposed radially inboard of the seal land 78, and the seal element tip 184 is radially next to the seal land 78 at its inner side. The seal land 78 thereby axially overlaps and circumscribes the seal element 90 and its seal element tip 184. The seal element tip 184 may also be radially engageable with (e.g., during the break-in) the seal land 78 at its inner side 86.

During turbine engine operation, the air seal 94 along with the seal land 78 substantially seal a gap between the stator vane structure 76 and the bladed rotor 92. The retainer head 144 and its frustoconical surface 212 may also provide a flow guide generally aligned with an outer surface of the rotor inner platform 124.

The air seal members 142 and 143 may form a sigmoid shaped structure coupling the retainer head 144 to a base of the air seal 94, where the air seal base includes the seal mount 140 and the axial flange 141. This sigmoid shaped structure may facilitate thermally induced movement of the retainer head 144 radially along the attachments 122 and/or the hub 104 while reducing internal thermally induced stresses therein. More particularly, the sigmoid shaped structure is a relatively flexible and thereby can accommodate slight thermally induced distortions without, for example, cracking following repeated thermal cycles.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:

an air seal configured to rotate about an axis, the air seal extending axially along the axis between a first side and a second side, and the air seal including an axial flange, a radial flange, a seal element, a retainer neck and a retainer head;

the axial flange extending axially to the second side of the air seal;

the radial flange connected to the axial flange at the second side of the air seal, and the radial flange projecting radially outward from the axial flange to a distal end;

the seal element projecting radially outward from the distal end of the radial flange;

the retainer neck connected to the radial flange at the distal end of the radial flange, and the retainer neck projecting axially out from the radial flange towards the first side of the air seal and then projecting radially outward to the retainer head;

the retainer head projecting axially towards the first side of the air seal and away from the retainer neck to an axial end of the retainer head; and a first groove projecting radially into the axial flange from an inner side of the axial flange, and the first groove located axially between the radial flange and the first side of the air seal.

2. The apparatus of claim 1, wherein the retainer neck includes an inner section, an outer section and an intermediate section;

the inner section projecting axially out from the radial flange to the intermediate section; and the outer section projecting radially outward from the intermediate section to the retainer head.

3. The apparatus of claim 2, wherein a thickness of the retainer neck decreases as the inner section extends axially towards the intermediate section.

4. The apparatus of claim 2, wherein the retainer neck follows a straight line trajectory as the inner section projects axially out from the radial flange to the intermediate section.

5. The apparatus of claim 2, wherein the retainer neck follows a trajectory as the inner section projects axially out from the radial flange to the intermediate section; and the trajectory is angularly offset from the axis by a non-zero acute angle less than ten degrees.

6. The apparatus of claim 2, wherein the retainer neck follows a straight line trajectory as the outer section projects radially outward from the intermediate section to the retainer head.

7. The apparatus of claim 2, wherein the retainer neck follows a trajectory as the outer section projects radially outward from the intermediate section to the retainer head; and the trajectory is angularly offset from the axis by between eighty-five degrees and ninety-five degrees.

8. The apparatus of claim 2, wherein the inner section is angularly offset from the outer section between eighty-five degrees and ninety-five degrees.

9. The apparatus of claim 2, wherein the retainer neck follows a curved trajectory as the intermediate section extends from the inner section to the outer section.

10. The apparatus of claim 1, wherein the air seal extends radially between an inner side and an outer side; and the retainer head is disposed at the outer side of the air seal.

11. The apparatus of claim 1, wherein the radial flange has a thickness greater than a thickness of the retainer neck.

12. The apparatus of claim 1, wherein the radial flange follows a trajectory as the radial flange projects radially outward from the axial flange to the distal end of the radial flange; and the trajectory is angularly offset from the axis by between eighty-five degrees and ninety-five degrees.

13. The apparatus of claim 1, wherein the axial flange follows a trajectory as the axial flange projects to the second side of the air seal; and the trajectory is angularly offset from the axis by a non-zero acute angle less than ten degrees.

14. The apparatus of claim 1, wherein the seal element comprises a knife-edge seal element.

15. The apparatus of claim 1, wherein a second groove projects radially into the axial flange from the inner side of the axial flange, and the second groove is located axially between the first groove and the first side of the air seal.

16. The apparatus of claim 1, further comprising:

a stationary structure comprising an abradable seal land;

the seal element projecting radially outward from the distal end of the radial flange to a tip, and a tip of the seal element radially inboard and next to the abradable seal land.

17. The apparatus of claim 1, further comprising:

a rotor including a rotor disk and a plurality of blades connected to the rotor disk;

the air seal further including a mount attached to the rotor disk, the axial flange extending axially out from the mount to the second side of the air seal; and the retainer head axially abutted against attachments of the plurality of blades.

18. An apparatus for a turbine engine, comprising:

an air seal configured to rotate about an axis, the air seal extending axially along the axis between a first side and a second side, and the air seal including a tubular member, an annular member, a seal element, a curved retainer neck and a retainer head;

the annular member circumscribing and connected to the tubular member at a first end of the air seal;

the seal element circumscribing and connected to the annular member at an outer end of the annular member;

the curved retainer neck connected to the annular member at the outer end of the annular member, and the curved retainer neck extending longitudinally along a trajectory out from the annular member to the retainer head, wherein the trajectory along an inner section of the curved retainer neck that is axially adjacent the annular member is angularly offset from the trajectory along an outer section of the curved retainer neck that is radially adjacent the retainer head by an offset angle between eighty degrees and one hundred degrees; and the retainer head projecting axially away from the curved retainer neck to opposing axial ends of the retainer head; and a groove projecting radially into the tubular member from an inner side of the tubular member, and the groove located axially between the annular member and the first side of the air seal.

19. An apparatus for a turbine engine, comprising:

a rotor including a rotor disk and a plurality of rotor blades attached to the rotor disk, the plurality of rotor blades arranged circumferentially around an axis in an array;

an air seal extending axially along the axis between a first side and a second side, the air seal including a mount, a radial flange, a knife-edge seal element, a retainer neck and a retainer head, the mount disposed at the first side of the air seal and attached to the rotor disk, the radial flange disposed at the second side of the air seal, the radial flange projecting radially outward away from the axis to a distal end, the knife-edge seal element disposed at the distal end of the radial flange, the retainer neck disposed at the distal end of the radial flange, the retainer neck projecting axially out from the radial flange towards the rotor and then projecting radially outward to the retainer head, and the retainer head projecting axially out from an outer section of the retainer neck in a first direction to a first end of the retainer head that axially engages the plurality of blades, and the retainer head projecting axially out from the outer section of the retainer neck in a second direction to a second end of the retainer head that is axially opposite the first end of the retainer head; and an abradable seal land circumscribing and radially next to a tip of the knife-edge seal element.

* * * * *